(12) United States Patent
Kanomata

(10) Patent No.: US 11,992,778 B2
(45) Date of Patent: May 28, 2024

(54) MIDAIR BALLOON-POPPING GAME TOOL, TOY DRONE, BALLOON-POPPING GAME TOOL, AND BALLOON-POPPING GAME METHOD

(71) Applicant: Yukio Kanomata, Kanagawa (JP)

(72) Inventor: Yukio Kanomata, Kanagawa (JP)

( * ) Notice: Subject to any disclaimer, the term of this patent is extended or adjusted under 35 U.S.C. 154(b) by 248 days.

(21) Appl. No.: 17/438,399

(22) PCT Filed: Mar. 12, 2020

(86) PCT No.: PCT/JP2020/010765
§ 371 (c)(1),
(2) Date: Sep. 10, 2021

(87) PCT Pub. No.: WO2020/184656
PCT Pub. Date: Sep. 17, 2020

(65) Prior Publication Data
US 2022/0143491 A1    May 12, 2022

(30) Foreign Application Priority Data

Mar. 13, 2019  (JP) ................................. 2019-045723

(51) Int. Cl.
*A63F 9/00* (2006.01)
*A63H 27/10* (2006.01)
*B64C 39/02* (2023.01)

(52) U.S. Cl.
CPC ........... *A63F 9/0079* (2013.01); *A63H 27/10* (2013.01); *B64C 39/024* (2013.01);
(Continued)

(58) Field of Classification Search
CPC ..... A63F 9/00; A63F 2007/1008–1091; A63H 5/00; A63H 27/10
See application file for complete search history.

(56) References Cited

U.S. PATENT DOCUMENTS 1,858,460 A * 5/1932 Ranseen ................ A63H 27/10
446/225
2,856,732 A * 10/1958 Weismantel ........... A63H 37/00
446/14
(Continued)

FOREIGN PATENT DOCUMENTS

JP         S63174889 U    11/1988

OTHER PUBLICATIONS

Rotor Riot, Balloon Skeet Shooting with Drones!!, Mar. 5, 2018, YouTube Video, 3 screenshots.*
(Continued)

*Primary Examiner* — Eugene L Kim
*Assistant Examiner* — Matthew B Stanczak
(74) *Attorney, Agent, or Firm* — HAUPTMAN HAM, LLP

(57) ABSTRACT

A dedicated midair balloon-popping game apparatus is used by attaching to a drone that can be remotely controlled. The midair balloon-popping game apparatus includes: a container, which includes an attachment portion for attachment to the drone, and is capable of accommodating a balloon in an inflated state; a pressed portion which is provided on an outer side of the container; a balloon-popping member which acts to pop the balloon inside the container when the pressed portion is pressed; and a pressing portion configured to collide with a pressed portion of a midair balloon-popping game apparatus of another player.

18 Claims, 11 Drawing Sheets

(52) U.S. Cl.
CPC ............ *A63F 2009/0084* (2013.01); *A63H 2027/1041* (2013.01); *A63H 2027/1066* (2013.01); *A63H 2027/1075* (2013.01); *B64U 2201/20* (2023.01)

(56) References Cited

U.S. PATENT DOCUMENTS

| | | | | |
|---|---|---|---|---|
| 2,912,791 A * | 11/1959 | Cohen | ............ | A63H 27/10 417/478 |
| 3,092,388 A * | 6/1963 | Wagenheim | ............ | A63F 9/0204 273/380 |
| 3,204,369 A * | 9/1965 | Green | ............ | A63H 5/00 446/397 |
| 3,357,128 A * | 12/1967 | Geiser | ............ | A63H 37/00 446/181 |
| 3,608,903 A * | 9/1971 | Cooper | ............ | A63F 9/0079 273/287 |
| 3,662,487 A * | 5/1972 | Seefluth | ............ | A63H 27/12 446/37 |
| 3,685,825 A * | 8/1972 | Dorazio | ............ | A63F 9/0079 273/458 |
| 3,795,400 A * | 3/1974 | Glass | ............ | A63F 9/0079 273/458 |
| 3,861,684 A * | 1/1975 | Gastin | ............ | A63F 9/0079 273/458 |
| 3,878,640 A * | 4/1975 | Kauffman | ............ | A63H 5/00 446/212 |
| 4,092,798 A * | 6/1978 | Oquita | ............ | A63H 37/00 428/7 |
| 4,113,261 A * | 9/1978 | Sims | ............ | A63F 3/00148 273/287 |
| 4,155,552 A * | 5/1979 | Jacobo | ............ | A63B 67/06 473/569 |
| 4,169,593 A * | 10/1979 | Wood | ............ | A63F 9/0079 273/458 |
| 4,201,387 A * | 5/1980 | Revermann | ............ | A63F 3/00006 273/243 |
| 4,453,711 A * | 6/1984 | Gin | ............ | A63F 9/0079 273/445 |
| 4,538,817 A * | 9/1985 | Ramella | ............ | A63F 9/0204 446/61 |
| 4,826,161 A * | 5/1989 | Rookmaaker | ............ | A63F 9/0093 273/458 |
| 4,881,733 A * | 11/1989 | Rehkemper | ............ | A63F 9/0079 273/458 |
| 4,900,020 A * | 2/1990 | Rehkemper | ............ | A63H 27/10 273/458 |
| 4,932,915 A * | 6/1990 | Boris | ............ | A63H 37/00 446/5 |
| 4,936,532 A * | 6/1990 | Williams | ............ | A63H 27/10 24/130 |
| 4,991,847 A | 2/1991 | Rudell et al. | | |
| 5,222,740 A * | 6/1993 | Wu | ............ | F41J 5/04 273/389 |
| 5,324,045 A * | 6/1994 | Trawick | ............ | A63F 9/0079 251/303 |
| 5,403,222 A * | 4/1995 | Koenig | ............ | A63F 9/0079 446/175 |
| 5,527,222 A * | 6/1996 | Demita | ............ | A63H 37/00 472/51 |
| 5,577,732 A * | 11/1996 | Spector | ............ | A63B 65/00 473/576 |
| 6,402,582 B1 * | 6/2002 | Sherer | ............ | A63H 27/10 273/458 |
| 7,134,665 B2 * | 11/2006 | Holsten | ............ | A63F 9/00 273/458 |
| 7,159,725 B1 * | 1/2007 | Gates | ............ | A47F 5/137 312/130 |
| 7,367,862 B2 * | 5/2008 | Tsai | ............ | A63H 37/00 446/397 |
| 7,481,727 B2 * | 1/2009 | Chia | ............ | A63B 43/00 473/577 |
| 8,257,134 B2 * | 9/2012 | Zuloff | ............ | A63F 5/04 124/37 |
| 9,011,258 B2 * | 4/2015 | Yu | ............ | A63J 99/00 472/56 |
| 9,254,444 B1 * | 2/2016 | Toomey | ............ | A63H 37/00 |
| 9,389,049 B2 * | 7/2016 | Hoetger | ............ | F41J 5/24 |
| 9,409,100 B2 * | 8/2016 | Hillery | ............ | A63H 37/00 |
| 10,293,267 B2 * | 5/2019 | Rehkemper | ............ | A63H 3/06 |
| 10,500,516 B1 * | 12/2019 | Macias-Castillo | ..... | A63H 27/10 |
| 10,525,332 B2 * | 1/2020 | Poynter | ............ | A63H 27/12 |
| 10,758,835 B1 * | 9/2020 | Kaye | ............ | A63H 27/10 |
| 11,097,198 B2 * | 8/2021 | Kaye | ............ | A63H 33/009 |
| 2006/0175760 A1 * | 8/2006 | Holsten | ............ | A63F 9/00 273/440 |
| 2008/0216803 A1 * | 9/2008 | Cuisinier | ............ | A63H 27/10 446/26 |
| 2010/0267309 A1 * | 10/2010 | Hyland | ............ | A63F 9/0079 446/188 |
| 2011/0177749 A1 * | 7/2011 | Zuloff | ............ | A63F 9/0079 446/473 |
| 2014/0011420 A1 * | 1/2014 | Halliburton | ............ | B64B 1/40 446/49 |
| 2015/0045127 A1 * | 2/2015 | Yu | ............ | A63H 27/10 472/56 |
| 2016/0121204 A1 * | 5/2016 | Shen | ............ | G05D 1/0094 463/40 |
| 2016/0158638 A1 * | 6/2016 | Olsen | ............ | A63F 9/14 273/402 |
| 2016/0250535 A1 * | 9/2016 | Yatsko | ............ | A63H 27/12 273/317.1 |
| 2017/0174343 A1 * | 6/2017 | Erickson | ............ | A61B 5/01 |
| 2018/0093781 A1 * | 4/2018 | Mallinson | ............ | A63F 13/803 |
| 2019/0030447 A1 * | 1/2019 | Zima | ............ | B64U 50/13 |
| 2019/0210723 A1 * | 7/2019 | Heinen | ............ | H01Q 1/34 |
| 2022/0134217 A1 * | 5/2022 | Sohn | ............ | B64F 1/20 463/6 |
| 2022/0143491 A1 * | 5/2022 | Kanomata | ............ | A63H 27/10 |
| 2022/0402606 A1 * | 12/2022 | Kovács | ............ | A63F 13/92 |
| 2022/0410018 A1 * | 12/2022 | Lee | ............ | A63F 13/213 |

OTHER PUBLICATIONS

Drone lecture session held at Trust Drone School rental Office, Japan Drone Media, Jul. 27, 2017, Web, URL:http//dronesmedia.jp/?p=7073, 12pp.

International Search Report in PCT/JP2020/010765, dated Jun. 9, 2020. 5pp.

* cited by examiner

MIDAIR BALLOON-POPPING GAME TOOL, TOY DRONE, BALLOON-POPPING GAME TOOL, AND BALLOON-POPPING GAME METHOD

RELATED APPLICATIONS

The present application is a National Phase of International Application No. PCT/JP2020/010765 filed Mar. 12, 2020, which claims priority to Japanese Application No. 2019-045723, filed Mar. 13, 2019.

TECHNICAL FIELD

The present invention relates to a midair balloon-popping game apparatus and a game aircraft for enabling players to enjoy a balloon-popping game in midair while remotely controlling drones, a balloon-popping game apparatus for popping a balloon attached to a base, and a balloon-popping game method.

BACKGROUND ART

As a kind of a multicopter which is capable of flying by remote control without a pilot, there exists a hobby drone for enjoyment as a hobby. As a kind of a competition or a game using this drone, there has been known a game of performing a midair battle with a plurality of drones each having a balloon attached thereto to compete for popping a balloon of an opponent ahead.

SUMMARY OF INVENTION

Technical Problem

However, a dedicated midair balloon-popping game apparatus suitable for popping a balloon with use of a drone or a balloon-popping game apparatus for popping a balloon attached to a base has not been provided yet. It is not always required that the balloon be attached to a drone and popped in midair.

In view of the above, the present invention is intended to propose a dedicated midair balloon-popping game apparatus that provides fun and excitement and a balloon-popping game apparatus for popping a balloon attached to a base.

Further, the present invention is intended to provide a game aircraft including a midair balloon-popping game apparatus, and a game aircraft including a balloon-popping game apparatus attached to a base.

Still further, the present invention is intended to provide a balloon-popping game method that provides fun and excitement.

Solution to Problem

In order to achieve the above-mentioned object, according to the invention of claim 1, there is provided a balloon-popping game apparatus, including: a container which is capable of accommodating a balloon in an inflated state; a pressed portion provided on an outer side of the container; and a balloon-popping portion which acts to pop the balloon inside the container when the pressed portion is pressed.

In order to achieve the above-mentioned object, according to the invention of claim 2, there is provided a midair balloon-popping game apparatus to be used by attaching to a drone that can be remotely controlled, the midair balloon-popping game apparatus including: a container, which includes an attachment portion for attachment to the drone, and is capable of accommodating a balloon in an inflated state; a pressed portion which is provided on an outer side of the container; a balloon-popping member which acts to pop the balloon inside the container when the pressed portion is pressed; and a pressing portion configured to collide with a pressed portion of a midair balloon-popping game apparatus of another player.

According to the invention of claim 2, a plurality of players each fly the drone under a state in which the midair balloon-popping game apparatus is attached to the drone, and remotely control the own drone so as to pop the balloon of other player while defending the drone so that the own balloon is not popped by the other player, thereby being capable of playing the balloon-popping in midair. That is, each player controls the drone in such a manner as to allow the own pressing portion to collide with a pressed portion of other player and so that the own pressed portion is not pressed by a pressing portion of other player. When the own pressing portion hits the pressed portion of the other player, the balloon-popping member of the other player acts to pop the balloon of the other player.

According to the midair balloon-popping game apparatus of the invention of claim 3, in claim 1 or 2, the container has a balloon insertion hole for allowing a balloon that is in an uninflated state to be inserted into the container.

According to the invention of claim 3, the balloon that is in the uninflated state is inserted from the balloon insertion hole into the container, and air is supplied from the outer side of the container to inflate the balloon, thereby being capable of arranging the balloon that is in the inflated state inside the container. In this case, it is convenient if a check valve for allowing only inflow of air is mounted to the balloon.

According to the midair balloon-popping game apparatus of the invention of claim 4, in claim 1, 2, or 3, a plurality of pressed portions are arranged around the container.

According to the invention of claim 4, a plurality of pressed portions are arranged around the container. Thus, the difficulty in defense increases as compared to the case in which one pressed portion is provided, thereby improving competitiveness. As a larger number of pressed portions are arranged, the difficulty in defense increases.

According to the midair balloon-popping game apparatus of the invention of claim 5, in claims 1 to 4, the balloon-popping member is an advancing/retreating member which is always urged to a non-contact retreating position with respect to the balloon inside the container, and the advancing/retreating member advances from the retreating position to pop the balloon inside the container when the pressed portion is pressed.

According to the midair balloon-popping game apparatus of the invention of claim 6, in claim 5, the advancing/retreating member has a sharp distal end portion.

According to the midair balloon-popping game apparatus of the invention of claim 7, in claim 5, a substance that causes the balloon to pop when in contact with the balloon is held at the distal end portion of the advancing/retreating member.

The invention according to claim 5, 6, or 7 provides specific examples of the balloon-popping member.

According to the midair balloon-popping game apparatus of the invention of claim 8, in any one of claims 1 to 7, the pressed portion includes a lateral pressed portion and an upward and/or downward pressed portion.

According to the invention of claim 8, the pressed portion can be pressed not only from sides but also from above and/or below. Thus, a wider variety of offense and defense by the player are provided, thereby improving fun in play.

According to the midair balloon-popping game apparatus of the invention of claim 9, in any one of claims 1 to 8, a horizontal annular protruding portion is provided around the container, the annular protruding portion projects outward of the container beyond the pressed portion, and the annular protruding portion serves as the pressing portion.

The invention according to claim 9 exemplifies a specific mode of the pressing portion.

According to the invention of claim 10, there is provided a game aircraft, including: the midair balloon-popping game apparatus of any one of claims 1 to 9; and a drone, which is remote-controllable, and allows the midair balloon-popping game apparatus to fly.

According to the invention of claim 10, actions and effects which are similar to those of the midair balloon-popping game apparatus according to any one of claims 1 to 8 can be obtained.

According to the invention of claim 11, there is provided a balloon-popping game apparatus, which is to be used by attaching to a base, the balloon-popping game apparatus including: a container, which includes an attachment portion for attachment to the base, and is capable of accommodating a balloon in an inflated state; a pressed portion provided on an outer side of the container; and a balloon-popping portion which acts to pop the balloon inside the container when the pressed portion is pressed.

According to the invention of claim 11, a plurality of players each fly the drone and remotely control the own drone to compete for popping, ahead of other player, the balloon accommodated in the balloon-popping game apparatus attached to the base. That is, each player controls the drone in such a manner as to allow the own drone to collide with the pressed portion of the balloon-popping game apparatus attached to the base. When the own drone hits the pressed portion of the balloon-popping game apparatus, the balloon-popping member acts to pop the balloon accommodated in the balloon-popping game apparatus attached to the base.

According to the balloon-popping game apparatus of the invention of claim 12, in claim 11, the container has a balloon insertion hole for allowing a balloon that is in an uninflated state to be inserted into the container.

According to the invention of claim 12, the balloon that is in the uninflated state is inserted from the balloon insertion hole into the container, and air is supplied from the outer side of the container to inflate the balloon, thereby being capable of arranging the balloon that is in the inflated state inside the container. In this case, it is convenient if a check valve for allowing only inflow of air is mounted to the balloon.

According to the balloon-popping game apparatus of the invention of claim 13, in claim 11 or 12, a plurality of pressed portions are arranged around the container.

According to the invention of claim 13, a plurality of pressed portions are arranged around the container. Thus, the difficulty in defense increases as compared to the case in which one pressed portion is provided, thereby improving competitiveness. As a larger number of pressed portions are arranged, the difficulty in defense increases.

According to the balloon-popping game apparatus of the invention of claim 14, in claim 11, 12, or 13, the balloon-popping member is an advancing/retreating member which is always urged to a non-contact retreating position with respect to the balloon inside the container, and the advancing/retreating member advances from the retreating position to pop the balloon inside the container when the pressed portion is pressed.

According to the balloon-popping game apparatus of the invention of claim 15, in claim 14, the advancing/retreating member has a sharp distal end portion.

According to the balloon-popping game apparatus of the invention of claim 16, in claim 14, a substance that causes the balloon to pop when in contact with the balloon is held at the distal end portion of the advancing/retreating member.

The invention according to claim 14, 15, or 16 provides specific examples of the balloon-popping member.

According to the invention of claim 17, there is provided a game aircraft, including: the balloon-popping game apparatus of any one of claims 11 to 15; and a drone, which is remote-controllable, and allows the balloon-popping game apparatus to fly.

According to the invention of claim 17, actions and effects which are similar to those of the balloon-popping game apparatus according to any one of claims 11 to 15 can be obtained.

According to the invention of claim 18, there is provided a game method of a balloon-popping game apparatus, in which a pressing portion of a game aircraft is caused to collide with a pressed portion of the balloon-popping game apparatus of any one of claims 11 to 16 or the game aircraft of claim 17 so that the pressed portion is pressed to pop a balloon accommodated in the container of the balloon-popping game apparatus.

DESCRIPTION OF EMBODIMENTS

Now, with reference to the accompanying drawings, an embodiment of this disclosure is described.

A balloon-popping game apparatus according to the present invention includes: a container which is capable of accommodating a balloon in an inflated state; a pressed portion provided on an outer side of the container; and a balloon-popping portion which acts to pop the balloon inside the container when the pressed portion is pressed.

A midair balloon-popping game apparatus according to the present invention is a game apparatus with which a plurality of players each fly a drone under a state in which the midair balloon-popping game apparatus is attached to the drone, and remotely control the own drone so as to pop the balloon of other player while defending the drone so that the own balloon is not popped by the other player, thereby playing the balloon-popping in midair.

Figure 1:
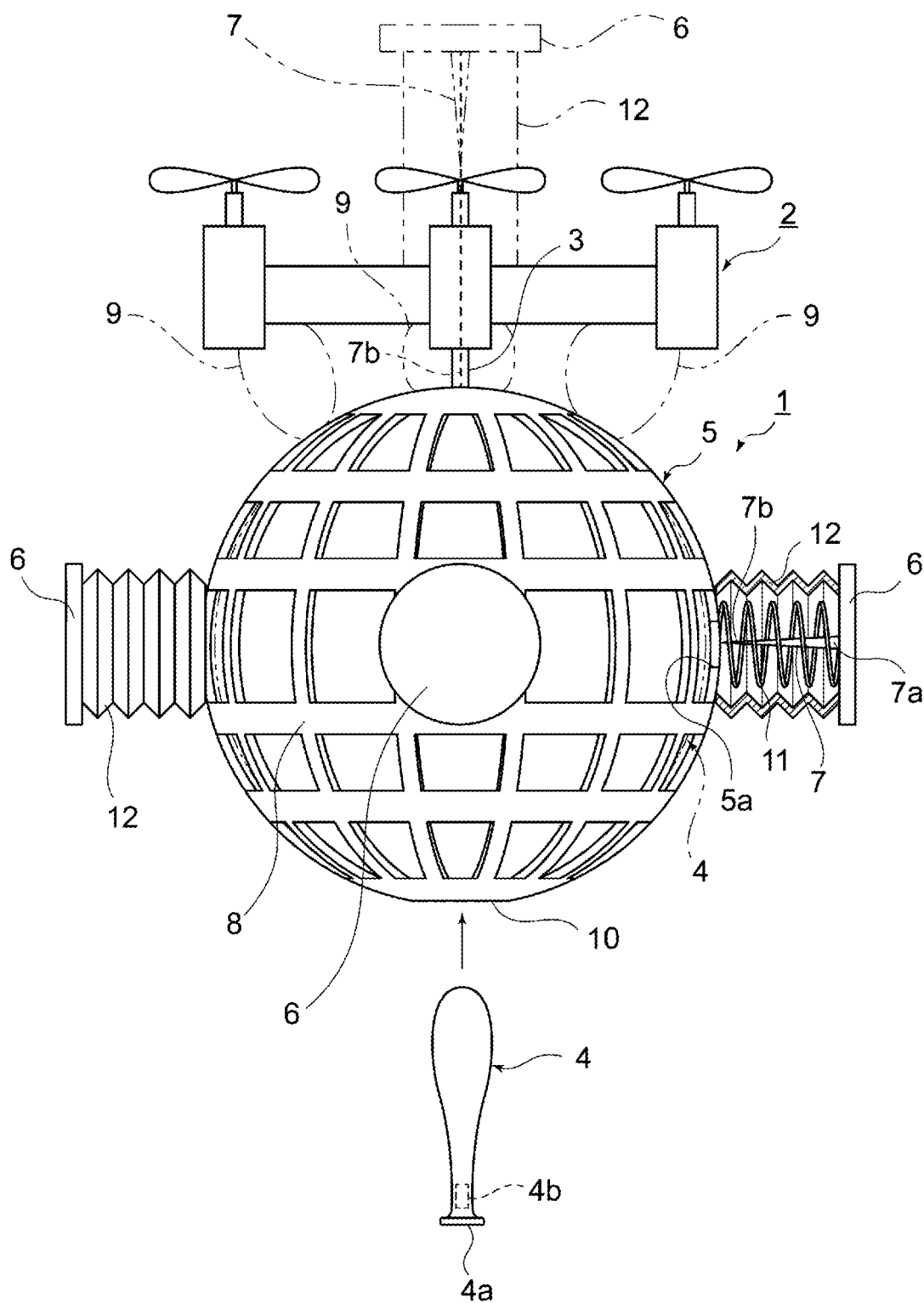
FIG. 1 is a partially cutaway front view for illustrating an aircraft including a midair balloon-popping game apparatus according to one embodiment of the present invention.

As illustrated in FIG. 1, a midair balloon-popping game apparatus 1 according to one embodiment of the present invention is used while being attached to a drone 2 that can be remotely controlled. The drone 2 is well known as a multicopter which is capable of flying by remote control without a pilot. Various kinds of drones are provided in accordance with a purpose of use. The midair balloon-popping game apparatus according to the present invention is adopted in competing for balloon-popping in midair while remotely controlling a drone. Thus, among the drones, a hobby drone for enjoyment as a hobby is particularly suitable.

The midair balloon-popping game apparatus 1 of FIG. 1 includes: a container 5, which includes an attachment portion 3 for attachment to the drone 2, and is capable of accommodating a balloon 4 in an inflated state; pressed portions 6 which are provided on an outer side of the container 5; balloon-popping members 7 which each act to pop the balloon inside the container 5 when a corresponding one of the pressed portions 6 is pressed; and a pressing portion 8 configured to collide with the pressed portion 6 of the midair balloon-popping game apparatus 1 of other player.

A plurality of players each fly the drone 2 under a state in which the midair balloon-popping game apparatus 1 is attached to the drone 2, and remotely control the own drone 2 so as to pop the balloon 4 of other player while defending the drone so that the own balloon 4 is not popped by the other player, thereby playing the balloon-popping in midair. That is, each player remotely controls the drone 2 so as to allow the own pressing portion 8 to collide with the pressed portion 6 of other player and so that the own pressed portion 6 is not pressed by the pressing portion 8 of other player. When the own pressing portion 8 hits the pressed portion 6 of the other player, the balloon-popping member 7 of the other player acts to pop the balloon 4 of the other player.

The container 5 accommodates the balloon 4 in the inflated state, and is made of a light-weight material such as a synthetic resin so as to be suitable for midair transfer by the drone 2. Further, the container 5 is assumed to collide with the midair balloon-popping game apparatus 1 of other player in midair. Thus, the container 5 is required to have such a strength that may tolerate the impact of collision.

The container 5 is attached to the drone 2 by the attachment portion 3. It is preferred that, in order to prevent the container 5 from interfering the stable flight of the drone 2 in the state of being attached to the drone 2, the attachment portion 3 for attachment to the drone 2 be such an attachment portion that the container 5 is located at the center below the drone 2 and a relative position with respect to the drone 2 is always kept constant. As a method of attaching the container 5 to the drone 2, any suitable method such as a screwing method or a fitting method may be employed.

The shape of the container 5 may be a polyhedron or may be a sphere or an ellipsoid. The container 5 is formed in a shape that is well adaptable to the balloon 4 to be accommodated in the inflated state. In the illustrated example, the container is spherical. It is preferred that the container 5 be a container having a mesh or a grid, or a transparent container so that the balloon 4 accommodated inside the container 5 can be seen from the outside.

The container 5 of FIG. 1 has a balloon insertion hole 10 through which a balloon that is in an uninflated state can be inserted into the container 5. The balloon 4 that is in the uninflated state is inserted from the balloon insertion hole 10 into the container 5, and air is supplied from the outer side of the container 5 to inflate the balloon 4, thereby being capable of arranging the balloon 4 that is in the inflated state inside the container 5. In this case, it is convenient if a check valve 4b for allowing only inflow of air is mounted to an intake port 4a of the balloon 4. The balloon 4 comes into close contact with an inner surface of the container 5 through inflation inside the container 5, and thus is formed into a shape in conformity with the shape of the inner surface of the container 5.

Although illustration is omitted, as another mode of the container, there may be provided a container which is formed of two container half bodies which are coupled to each other in an openable and closable manner. In this case, the container half bodies may be coupled to each other in such a manner as to cover the inflated balloon with the two container half bodies. Also by this method, the inflated balloon may be caused to come into close contact with the inner surface of the container and formed into the shape in conformity with the shape of the inner surface of the container. However, it is more preferred that the balloon 4 be placed in the container 5 from the balloon insertion hole 10 and inflated inside the container 5 as illustrated in FIG. 1 because the balloon 4 can easily be formed into the shape in conformity with the shape of the inner surface of the container 5.

Tubular bodies 12, which are extendable and compressible and each include a spring 11, are fixed on the outer side of the container 5.

An outer end portion of the spring 11 is fixed to a lid body 6 having a plate shape, and the lid body 6 is fixed to an outer end portion (end portion on a side far from the center of the container 5) of the tubular body 12. An inner end portion (end portion on a side close to the center of the container 5) of the tubular body 12 is fixed to an outer surface of the container 5. When the lid body 6 being the pressed portion is pressed in the direction of approaching the container 5, the spring 12 is compressed so that the tubular body 12 is shifted to a compressed state. When the pressing of the lid body 6 is released, an urging force of the spring 12 causes the tubular body 12 to return to an original extended state. As a specific example of the extendable and compressible configuration of the tubular body 12, as illustrated in FIG. 1, the tubular body 12 may be formed in the form of the extendable and compressible bellows. Further, as another example, as illustrated in FIG. 3, the tubular body 12 may be formed of an inner tube 12a and an outer tube 12b which fit to each other in the extendable and compressible manner and in an undroppable manner.

Figure 3:
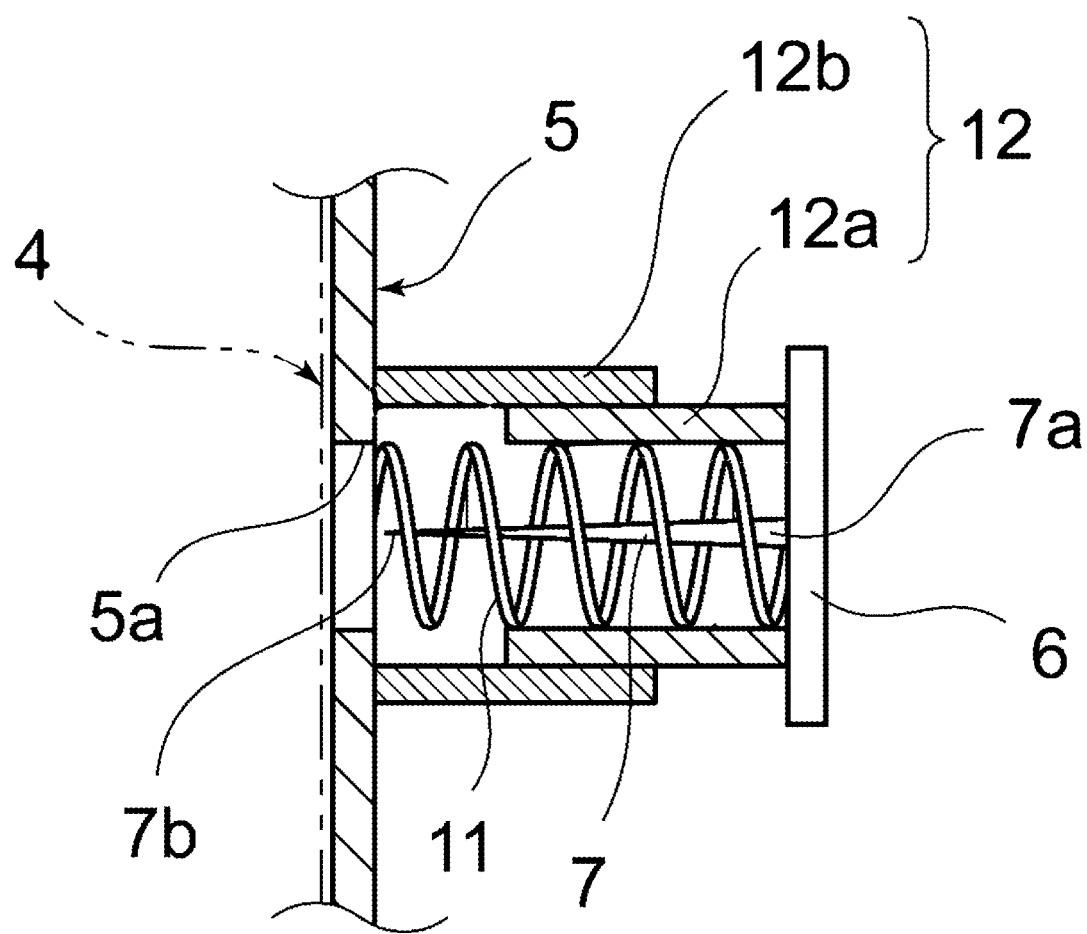
FIG. 3 is a sectional view for illustrating another example of a tubular body of FIG. 1.

In FIG. 1 and FIG. 3, when the lid body 6 being the pressed portion is pressed so that the tubular body 12 and the spring 12 are compressed, the balloon-popping member 7 acts to pop the balloon 4 inside the container 5. As the balloon-popping member 7, there may be employed an advancing/retreating member 7 which is always urged to a non-contact retreating position (positions illustrated in FIG. 1 and FIG. 3) with respect to the balloon 4 inside the container 5. The advancing/retreating member 7 is arranged inside the tubular body 12. A rear end portion 7a of the advancing/retreating member 7 is connected to the lid body 6, and a distal end portion 7b is sharp. When the lid body 6 is pressed, the advancing/retreating member 7 advances from the retreating position so that the sharp distal end portion 7b passes through a hole 5a of the container 5 to pop the balloon 4 inside the container 5. When the pressing of the lid body 6 is released, the urging force of the spring 11 causes the advancing/retreating member 7 to return to an original retreating position.

Figure 4:
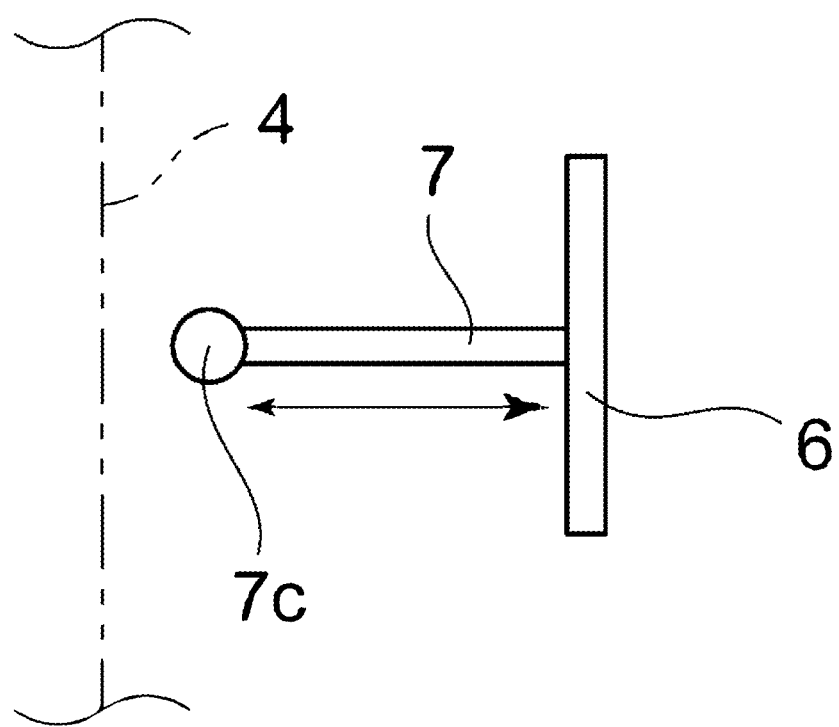
FIG. 4 is a side view for illustrating another example of a balloon-popping member of FIG. 1.

In place of the mode in which the distal end portion 7b is sharp, the advancing/retreating member 7 may also be in the mode in which a substance that causes the balloon 4 to pop when in contact with the balloon 4 is held at the distal end portion. Specifically, for example, as illustrated in FIG. 4, there may be provided an advancing/retreating member including, at a distal end portion thereof, a sponge 7c containing a liquid such as oil that causes the balloon 4 to pop when in contact with the balloon 4. Further, the advancing/retreating member 7 may be a file piece, nylon piece, an iron wire, or a fishing line.

Figure 2:
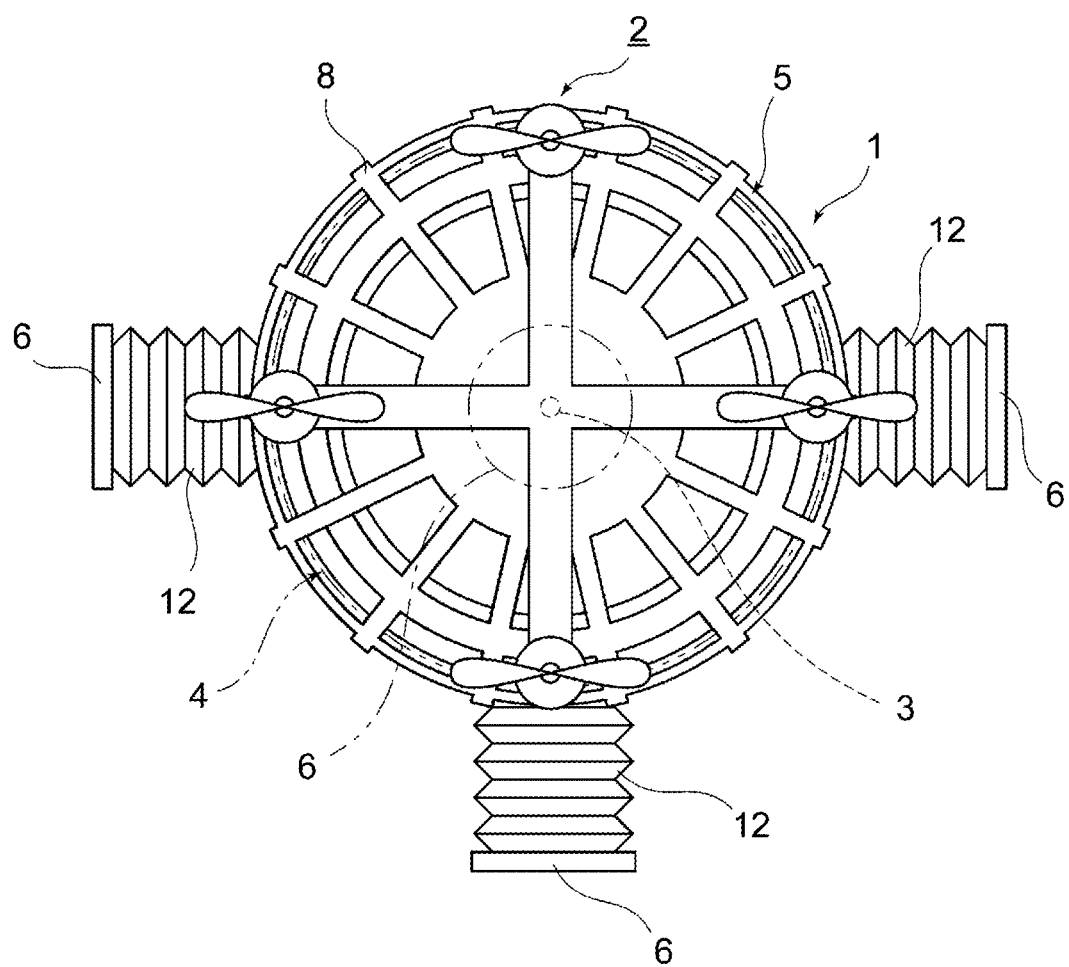
FIG. 2 is a plan view of FIG. 1.

It is preferred that, as illustrated in FIG. 1 and FIG. 2, a plurality of lid bodies 6 being the pressed portions be arranged around the container 5. This is because, with such a configuration, the difficulty in defense increases as compared to the case in which one pressed portion 6 is provided, thereby improving competitiveness. As a larger number of pressed portions 6 are arranged, the difficulty in defense increases.

The pressing portion 8 for popping the balloon 4 of other player is a part of the midair balloon-popping game apparatus 1 other than the pressed portions 6. A major part of the outer surface of the container 5 serves as the pressing portion 8. Each player remotely controls the drone 2 so as to allow the part other than the own lid bodies 6 (pressing portion 8) to collide with the lid body 6 (pressed portion) of other player.

As indicated by the two-dot chain lines in FIG. 1, when suitable additional members 9 each formed of a cushion material or the like are arranged between the container 5 and the drone 2, the additional members 9 also function as pressing portions for popping the balloon 4 of other player.

Although not limited, in the example illustrated in FIG. 1 and FIG. 2, three pressed portions 6 are provided at angular intervals of 90 degrees on an outer periphery in the horizontal direction at a center position in the up-and-down direction of the container 5 having a spherical shape, and the angle range of 180 degrees on the side opposite to the three pressed portions 6 on the surface of the container 5 serves as the main pressing portion 8.

The mode of arrangement (arrangement positions and arrangement amounts) of the pressing portion 8 and the pressed portions 6 on the container 5 may be variously devised to change the degree of difficulty in the balloon-popping competition.

Figure 5:
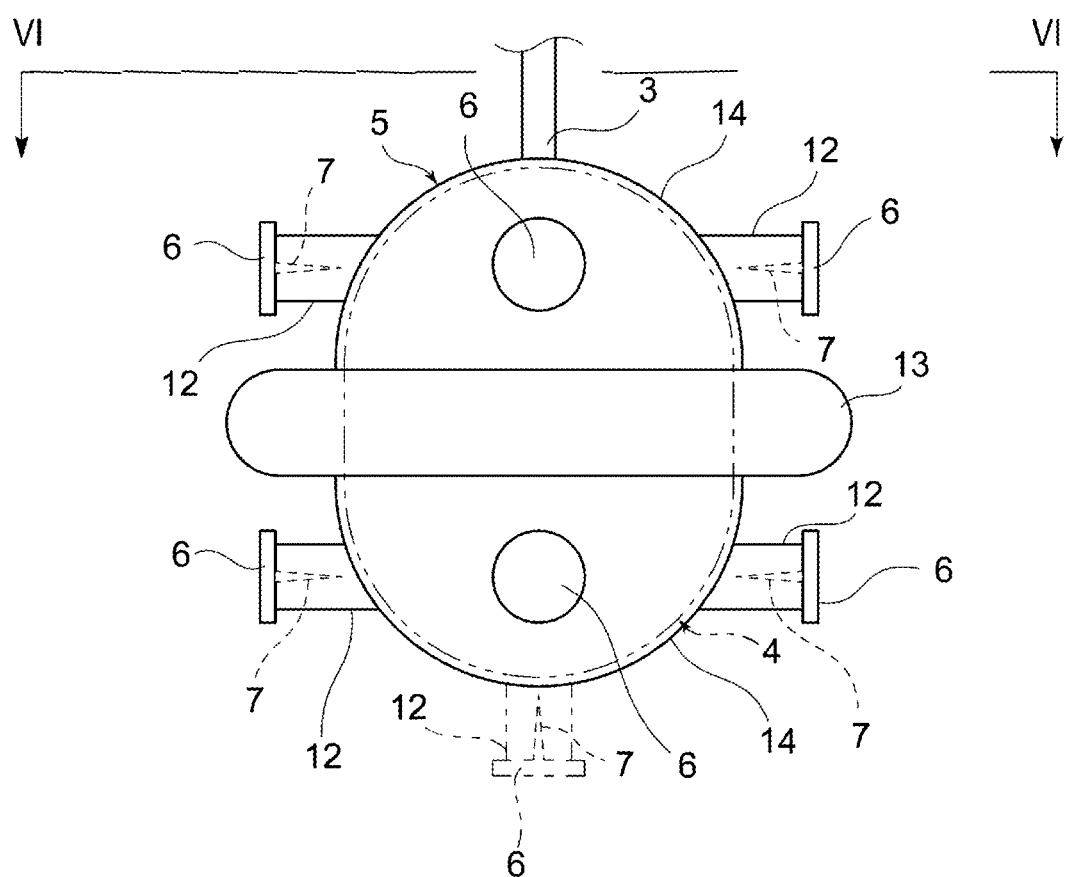
FIG. 5 is a front view for illustrating another example of the midair balloon-popping game apparatus of FIG. 1.
Figure 6:
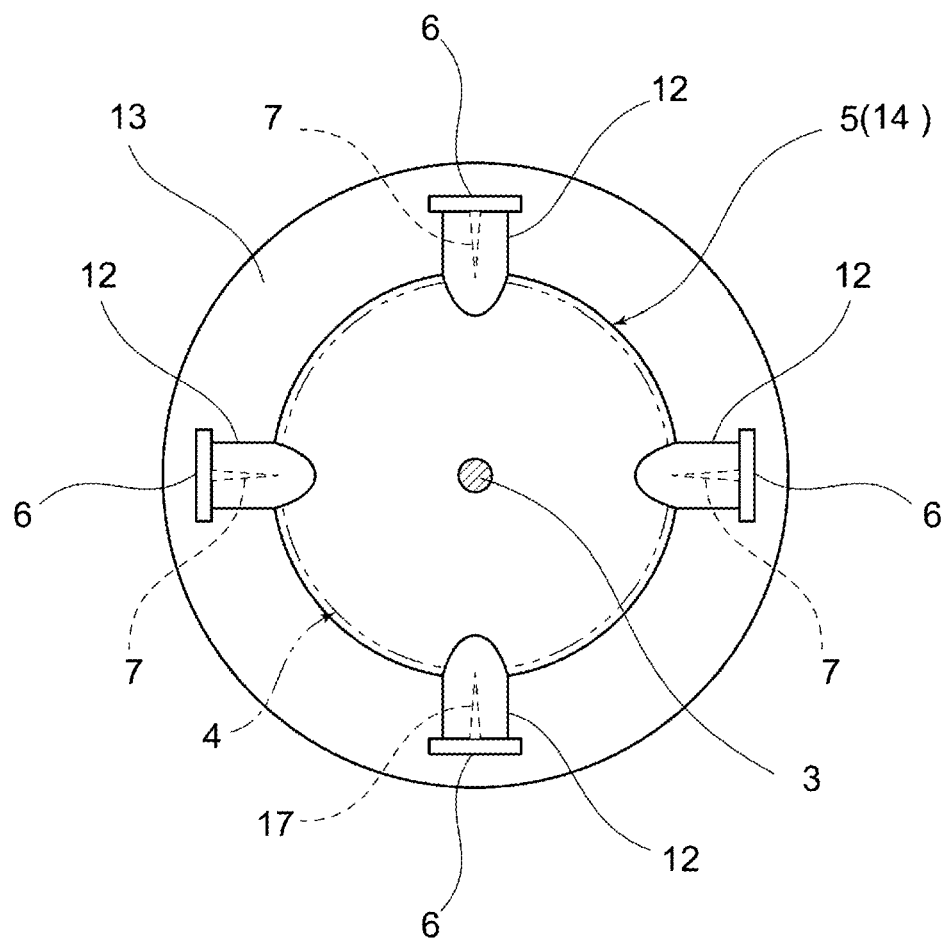
FIG. 6 is a plan view as seen in the direction indicated by arrows of the line VI-VI of FIG. 5.

For example, as another example of the mode of arrangement of the pressing portion 8 and the pressed portions 6 on the container 5, the embodiment illustrated in FIG. 5 and FIG. 6 may be employed. In this embodiment, the container 5 has such a shape that a sphere is stretched in the up-and-down direction, and an annular protruding portion 13 is provided on the outer periphery in the horizontal direction at the center position in the up-and-down direction of the container 5. The annular protruding portion 13 serves as the pressing portion. The overall shape of the container 5 and the annular protruding portion 13 is such a shape that a float ring is fitted to a sphere that is stretched upward and downward. On each of upper and lower semispherical containers 14 located above and below the annular protruding portion 13, four pressed portions 6 are arranged at angular intervals of 90 degrees on the outer periphery in the horizontal direction. The annular protruding portion 13 projects outward beyond the pressed portions 6. In FIG. 5 and FIG. 6, members or elements which are the same as or equivalent to those of FIG. 1 and FIG. 2 are denoted by the same reference symbols as those of FIG. 1 and FIG. 2.

According to the embodiment of FIG. 5 and FIG. 6, the balloon-popping competition which is different in the degree of difficulty from that of the embodiment of FIG. 1 and FIG. 2 can be enjoyed.

The examples given above are examples in which the pressed portions 6 are arranged laterally on the side surface of the container 5 located below the drone 2 (that is, the tubular bodies 12 are arranged in such a manner as to extend in the horizontal direction). In this case, an attack by the opponent can easily be evaded by escaping to a position below the drone 2 of the opponent. Thus, it is assumed that the fun of the competition becomes insufficient. Accordingly, as indicated by the two-dot chain lines in FIG. 1 and FIG. 2, the pressed portions 6 may also be arranged upward from the drone 2 (that is, the tubular body 12 is arranged in such a manner as to extend in the up-and-down direction). In this way, when the drone 2 of the opponent escapes to the position below the own drone 2, the attack can be given on the upward pressed portion 6 of the opponent from above. Thus, the fun of the competition is improved. In this case, the lower surface of the container 5 serves as the pressing portion 8 for attacking the upward pressed portion 6 of the opponent.

The upward pressed portion 6 may be arranged in the following manner. That is, the upward pressed portion 6 is arranged at the center portion of the drone 2 as illustrated in FIG. 2, and the advancing/retreating member 7 is arranged in such a manner as to pass through the drone 2 and the attachment portion 3 as illustrated in FIG. 1.

As indicated by two-dot chain lines in FIG. 5, a downward pressed portion 6 may also be provided on the lower surface of the container 5. In this way, when the drone 2 of the opponent escapes to the position above the own drone 2, an attack can be given on the downward pressed portion 6 of the opponent from below. In this case, it is only required that an upward projecting portion be additionally arranged at an upper portion of the drone 6 so that the projecting portion serves as the pressing portion 8 for giving the attack on the downward pressed portion 6 of the opponent.

In FIG. 1 to FIG. 6, the pressed portions 6 are provided upwardly, downwardly, and laterally with respect to the container. However, not limited to such directions, the pressed portions 6 may be provided obliquely.

Further, the advancing/retreating member 7 is installed in such a manner as to be parallel to the tubular body 12 and perpendicular to the lid body 6. However, not limited to such configuration, the advancing/retreating member 7 may be installed obliquely from the lid body 6.

The midair balloon-popping game apparatus 1 according to the present invention may be sold and used in such a manner that the midair balloon-popping game apparatus 1 itself is sold and a user attaches it to the existing drone 2. Alternatively, the midair balloon-popping game apparatus 1 may be sold as a game aircraft in a state of being attached to the drone 2.

Figure 7:
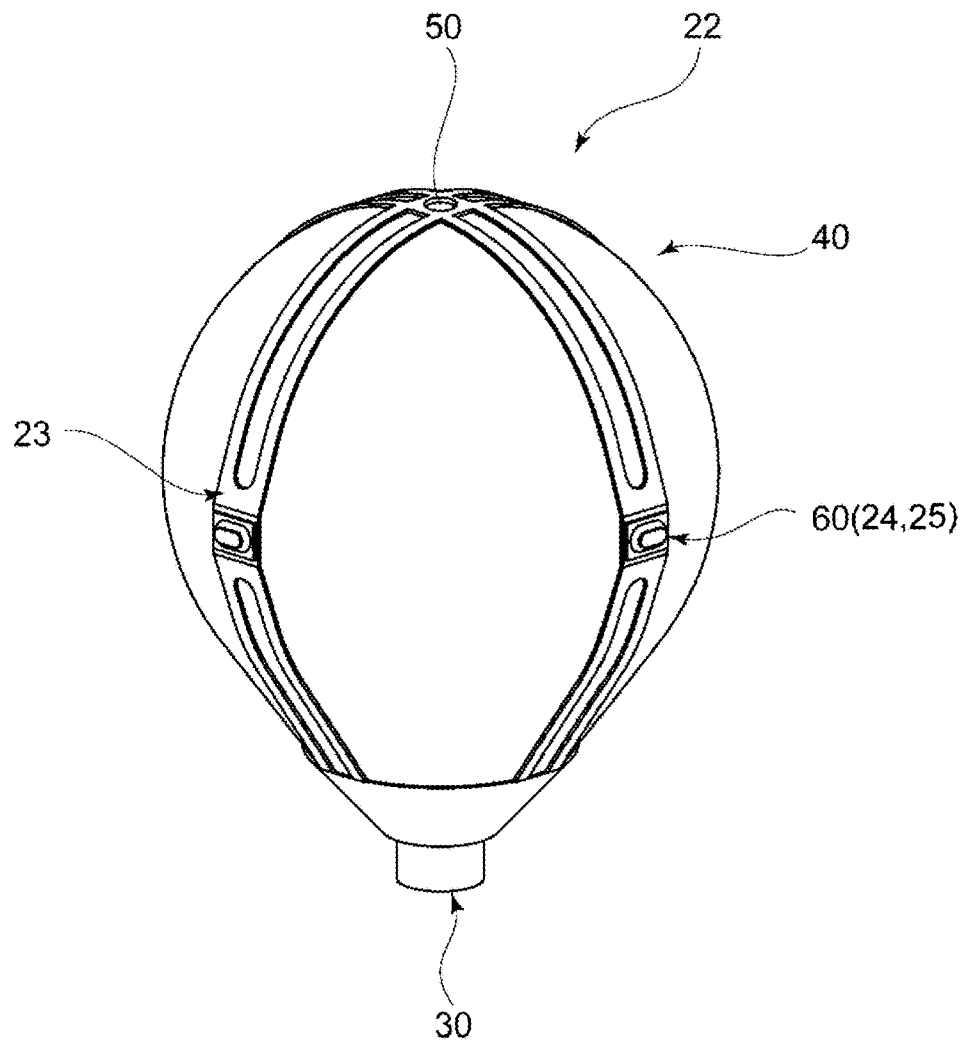
FIG. 7 is a perspective view for illustrating a balloon-popping game apparatus according to one embodiment of the present invention.

With reference to FIG. 7, description is made of a balloon-popping game apparatus 22 which is different from those illustrated in FIG. 1 to FIG. 6. FIG. 7 is an enlarged view for illustrating the balloon-popping game apparatus 22.

The balloon-popping game apparatus 22 includes a container (belts 23) which is capable of accommodating a balloon 40 in an inflated state.

The balloon-popping game apparatus 22 includes an attachment portion 30 for attachment to a balloon-fixing rod 21 or a drone 500, which are described later.

The belt 23 fixes the balloon 40 under a state in which the balloon 40 is inflated. The belt 23 is made of a light-weight material such as a synthetic resin.

In FIG. 7, the balloon is fixed with two belts 23. However, the balloon may be fixed with one belt 23 or three or more belts 23.

The belt 23 has a balloon attachment hole 50 for introducing the balloon. In FIG. 7, the balloon attachment hole 50 is formed at a position at which the two belts 23 intersect each other.

The balloon 40 is introduced from the balloon attachment hole 50, and the balloon is inflated with use of an air introduction pump. Further, the balloon 40 may be inflated by blowing air by mouth.

For the balloon-popping game apparatus 22, a container other than the belt 23 may be used. For example, there may be used a container having a polyhedral shape, a spherical shape, or an ellipsoidal shape, which is capable of accommodating the balloon 40 in the inflated state. It is preferred that this container be a container having a mesh or a grid, or a transparent container so that the balloon provided inside can be seen from the outside.

The belts 23 are each provided with balloon-popping portions 60 each including a pressed portion 24 and balloon-popping members 25. The pressed portion 24 is provided on an outer side of the belt. The balloon-popping members 25 act to pop the balloon inside the container when the pressed portion is pressed.

In FIG. 7, two balloon-popping portions 60 are provided to one band 23 (in FIG. 7, another balloon-popping portion 60 cannot be seen). However, only one balloon-popping portion 60 may be provided to one band 23, or three or more balloon-popping members 60 may be provided.

Figure 8:
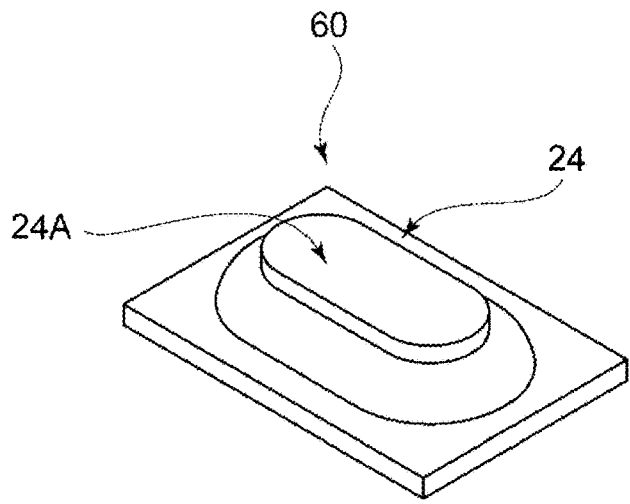
FIG. 8 is an enlarged perspective view for illustrating a front surface of a balloon-popping portion of the balloon-popping game apparatus of FIG. 7.
Figure 9:
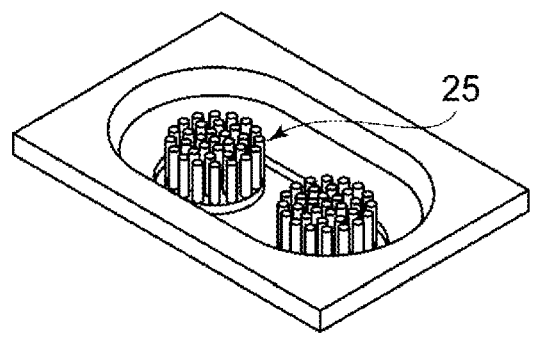
FIG. 9 is an enlarged perspective view for illustrating a back surface of the balloon-popping portion of the balloon-popping game apparatus of FIG. 7.
Figure 10:
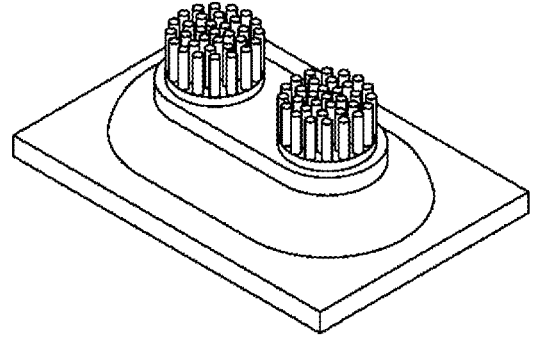
FIG. 10 is an enlarged perspective view for illustrating the back surface of the balloon-popping portion when the front surface of the balloon-popping portion of the balloon-popping game apparatus of FIG. 7 is pressed.

FIG. 8 to FIG. 10 are explanatory views for illustrating one mode of the balloon-popping portion 60 (pressed portion 24 and balloon-popping members 25).

FIG. 8 is an enlarged view for illustrating the pressed portion 24 of the balloon-popping portion 60. The pressed portion 24 is made of an elastic material (specifically, silicon rubber). A material of the pressed portion 24 is not limited to the elastic material (rubber) and may be any material which is deformed by application of an external force but returns to an original shape by high internal stress.

In FIG. 8, the pressed portion 24 is formed of a base portion, a first layer portion, and a second layer portion. The base portion has a plate shape. The first layer portion is located on the base portion. The second layer portion is located on the first layer portion.

FIG. 8 shows a front surface of the pressed portion 24, and FIG. 9 shows a back surface of the pressed portion 24 (FIG. 8 is turned by 180 degrees).

The back surface of the pressed portion 24 has a cavity formed in conformity with the shape of the first layer portion and the second layer portion.

The balloon-popping members 25 (advancing/retreating members) are provided inside the cavity in the back surface of the pressed portion 24.

A plurality of nylon pieces are used for each of the balloon-popping members 25 (advancing/retreating members) of FIG. 9. A plurality of iron wires or a plurality of fishing lines may be used in place of the nylon pieces.

Further, one nylon piece, one iron wire, or one nylon piece may also be used.

Further, as the balloon-popping member 25, a needle having a sharp distal end portion 7 as illustrated in FIG. 1 may be used. One needle or a plurality of needles may be used.

When a front surface 24A of the pressed portion 24 of FIG. 8 is pressed (external force is applied), the pressed portion 24 is deformed. Then, the balloon-popping members 25 (advancing/retreating members) protrude in the direction toward the balloon 40 fixed with the bands 23 and act to pop the balloon 40 (see FIG. 7 and FIG. 10).

When the pressing of the pressed portion 24 is released, the stress causes the pressed portion 24 to return to an original state.

Figure 11:
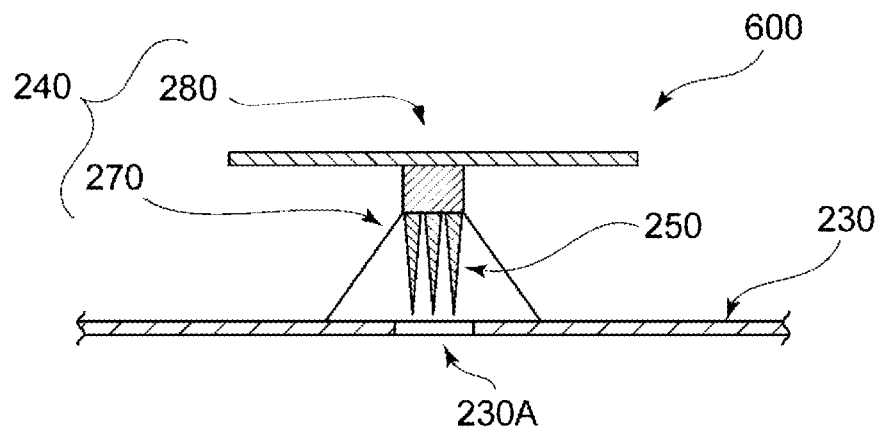
FIG. 11 is a front view for illustrating a balloon-popping portion in another embodiment of the present invention.

With reference to FIG. 11, description is made of another mode of a balloon-popping portion 600 (pressed portion 240 and balloon-popping member 250).

The balloon-popping portion 600 includes a silicon switch 270, a lid body 280, and the balloon-popping member 250 (advancing/retreating member). The silicon switch 270 and the lid body 280 form the pressed portion 240. The silicon switch 270 is made of silicon rubber. The lid body 280 has a plate shape and is provided on one side of the silicon switch 270 (direction away from the belt 230). The balloon-popping member 250 is provided inside the silicon switch 270.

The silicon switch 270 may have a tubular shape or a trapezoidal shape, or any other shape that allows the balloon-popping member 250 to be installed inside.

The balloon-popping portion 600 is provided to the belt 230. The belt 230 has a hole 230A for allowing the balloon-popping member 250 (advancing/retreating member) to pop the balloon.

Figure 12:
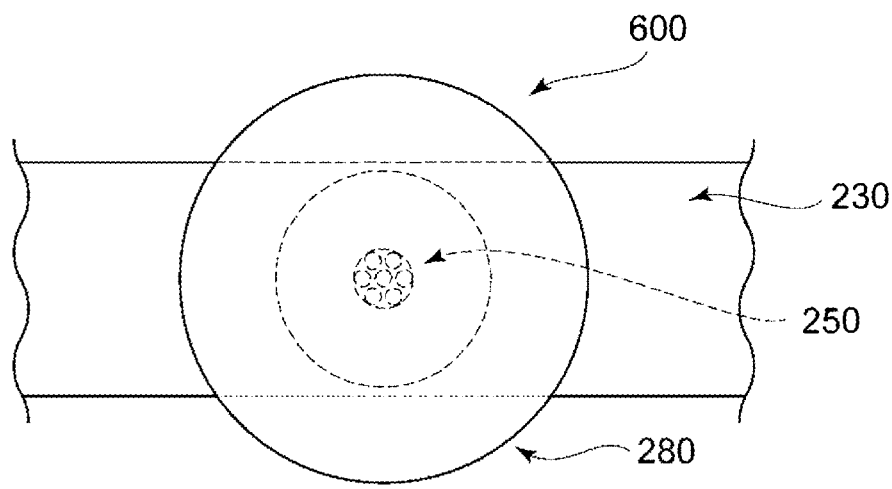
FIG. 12 is a plan view for illustrating the balloon-popping portion of FIG. 11.

FIG. 12 is a plan view for illustrating the balloon-popping member 600 and the belt 230.

When the lid body 280 of the balloon-popping portion 600 is pressed (external force is applied), the silicon switch 270 of the balloon-popping portion 600 is deformed. Then, the balloon-popping member 250 (advancing/retreating member) passes through the hole 220A formed in the belt 220 and acts to pop the balloon fixed with the band 220.

When the pressing of the lid body 280 is released, the stress causes the silicon switch 270 to return to an original state.

A plurality of needles each having a sharp distal end are used as the balloon-popping member 250 (advancing/retreating member) of FIG. 11. However, one needle may be used.

Further, one or a plurality of nylon pieces, one or a plurality of iron wires, or one or a plurality of nylon pieces may also be used in place of the needles.

Figure 13:
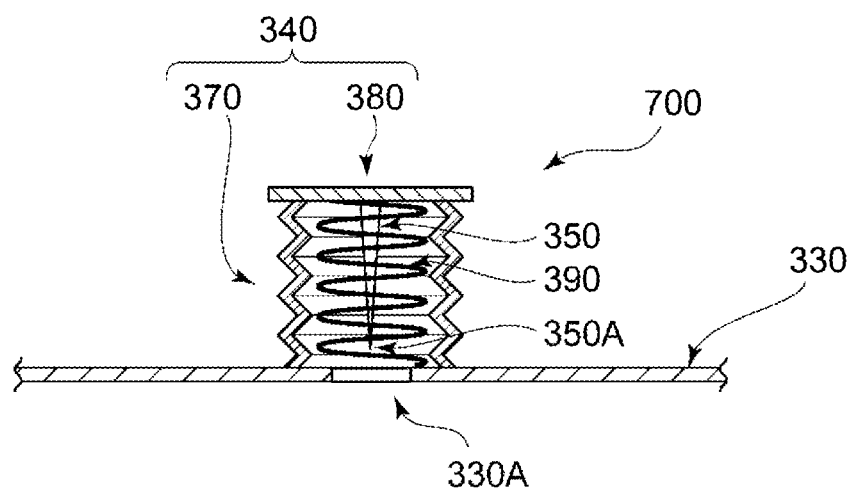
FIG. 13 is a front view for illustrating a balloon-popping portion in another embodiment of the present invention.

With reference to FIG. 13, description is made of another mode of the balloon-popping portion (balloon-popping portion 700).

The balloon-popping portion 700 includes a lid body 380, a tubular body 370, a spring 390, and a balloon-popping member 350 (advancing/retreating member). The lid body 380 and the tubular body 370 correspond to the pressed portion 340. The lid body 380 has a plate shape. The tubular body 370 connects between the lid body 380 and a belt 330. The spring 390 and the balloon-popping member 350 are provided inside the tubular body 370.

The balloon-popping portion 700 is provided to the belt 330. The belt 330 has a hole 330A for allowing the balloon-popping member 350 (advancing/retreating member) to pop the balloon.

An outer end portion of the spring 390 is fixed to the lid body 380 having a plate shape, and the lid body 380 is fixed to one end (end portion on a side away from the belt 320) of the tubular body 370. Another end (end portion on a side close to the belt 320) of the tubular body 370 is fixed to an outer surface of the belt 330. When the lid body 380 being the pressed portion 340 is pressed in the direction of approaching the belt 330, the spring 390 is compressed so that the tubular body 370 is shifted to a compressed state. When the pressing of the lid body 380 is released, an urging force of the spring 390 causes the tubular body 370 to return to an original extended state. As a specific example of the extendable and compressible configuration of the tubular body 370, as illustrated in FIG. 1, the tubular body 370 may be formed in the form of the extendable and compressible bellows. Further, as another example, as illustrated in FIG. 3, the tubular body 370 may be formed of an inner tube and an outer tube which fit to each other in the extendable and compressible manner and in an undroppable manner.

When the lid body 380 being the pressed portion 340 is pressed so that the tubular body 370 and the spring 390 are compressed, the balloon-popping member 350 (advancing/retreating member) acts to pop the balloon inside the belt 330. As the balloon-popping member 350 (advancing/retreating member), there may be employed a member which is always urged to a non-contact retreating position with respect to the balloon inside the belt 330.

The balloon-popping member 350 (advancing/retreating member) is arranged inside the tubular body 370. One end of the advancing/retreating member 360 is connected to the lid body 380, and a distal end portion 350A at another end is sharp.

When the lid body 380 is pressed, the balloon-popping member 350 (advancing/retreating member) advances from the retreating position so that the sharp distal end portion 350A passes through a hole 320A of the belt 320 to pop the balloon inside the belt 320. When the pressing of the lid body 380 is released, the urging force of the spring 390 causes the balloon-popping member 350 (advancing/retreating member) to return to an original retreating position.

One needle having a sharp distal end is used as the balloon-popping member 350 (advancing/retreating member) of FIG. 13. However, a plurality of needles may be used.

Further, one or a plurality of nylon pieces, one or a plurality of iron wires, or one or a plurality of nylon pieces may also be used in place of the needle.

The advancing/retreating member 350 may also be in the mode in which a substance that causes the balloon to pop when in contact with the balloon is held at the distal end portion. Specifically, for example, as illustrated in FIG. 4, there may be provided an advancing/retreating member including, at a distal end portion thereof, the sponge 7c containing a liquid such as oil that causes the balloon 4 to pop when in contact with the balloon 4.

In FIG. 7 to FIG. 13, the pressed portions 6 are provided laterally with respect to the container (belt). However, not limited to such directions, the pressed portions 6 may be provided obliquely.

Further, the advancing/retreating member 7 is installed in such a manner as to be perpendicular to the pressed portion. However, not limited to such configuration, the advancing/retreating member 7 may be installed obliquely from the pressed portion.

The balloon-popping game apparatus 22 according to the present invention may be sold and used in such a manner that the balloon-popping game apparatus 22 itself is sold and a user attaches it to the existing drone 2. Alternatively, the balloon-popping game apparatus 22 may be sold as a game aircraft in a state of being attached to the drone 2.

Figure 14:
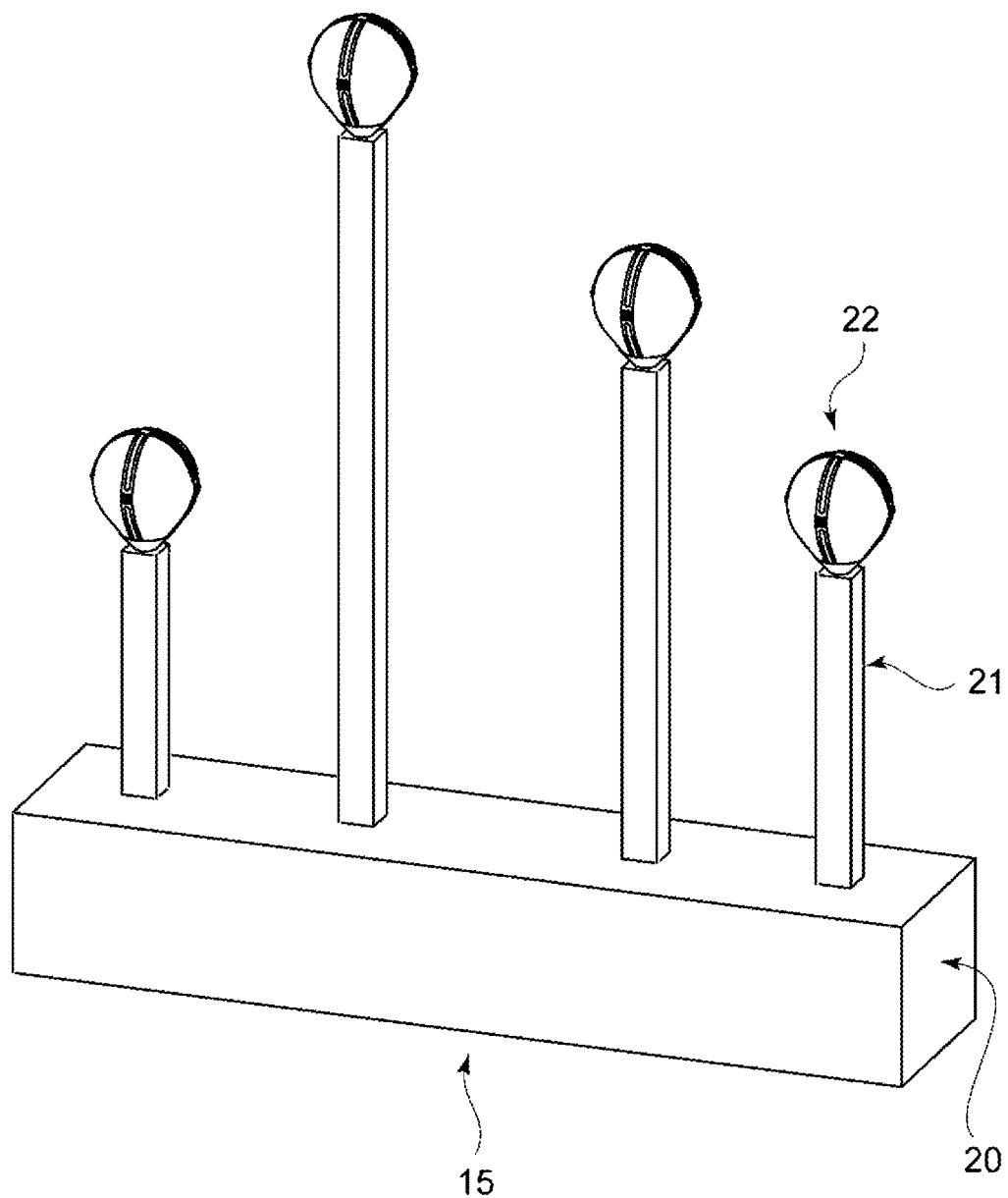
FIG. 14 is an explanatory view for illustrating a balloon-popping game method according to one embodiment of the present invention.
Figure 15:
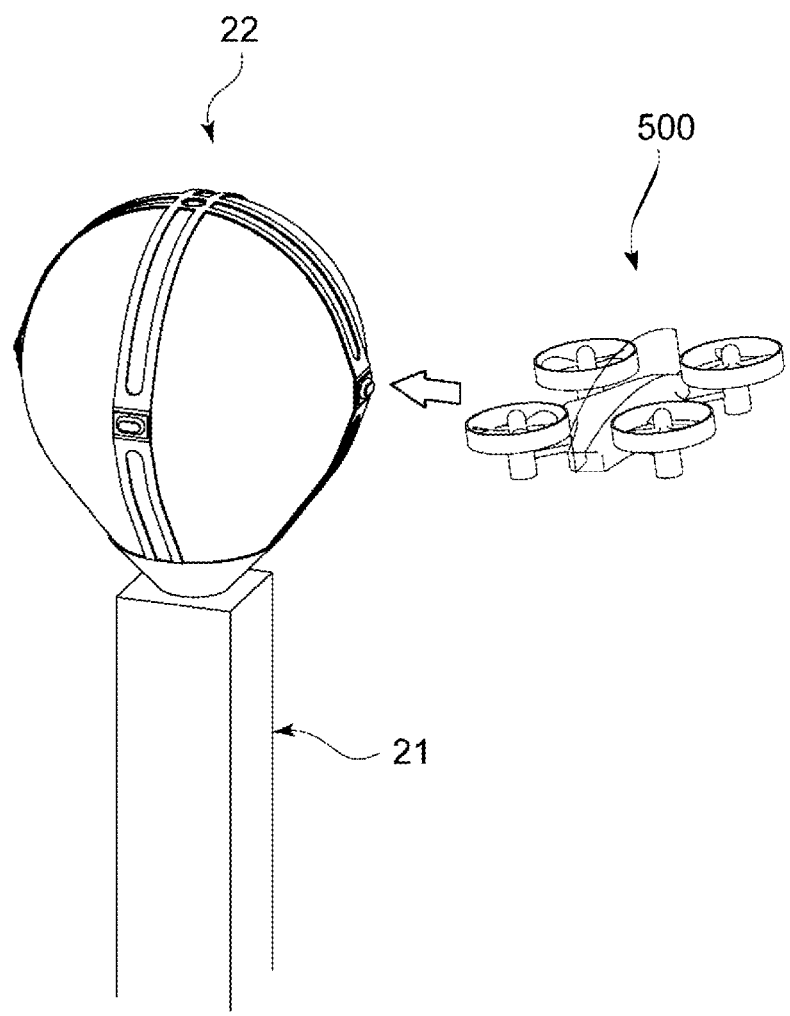
FIG. 15 is an explanatory view for illustrating a balloon-popping game method according to one embodiment of the present invention.

With reference to FIG. 14 and FIG. 15, description is made of a balloon-popping game method.

With reference to FIG. 14, description is made of a balloon fixing portion 15. The balloon fixing portion 15 includes a fixing base 20 having a rectangular shape. The fixing base 20 is installed on a floor or a desk in a house, or is installed on the ground outside. A plurality of balloon fixing rods 21 are provided on the fixing base 20.

The balloon fixing rods 21 are provided upward (vertical direction) on the fixing base 20.

Only one balloon fixing rod 21 may be provided.

The balloon-popping game apparatus 22 described with reference to FIG. 7 to FIG. 13 are installed at distal ends of the balloon-fixing rods 21. It is not always required that the balloon-popping game apparatus 22 be installed at the distal end of the balloon fixing rod 21. The balloon-popping game apparatus 22 may be provided in the middle of the balloon fixing rod 21. Further, also with regard to the direction of installation, it is not always required that the balloon insertion hole 50 face the ceiling. The balloon insertion hole 50 may be installed on a side surface of the balloon fixing rod 21.

The balloon-popping game apparatus 22 is fixed to the balloon fixing rod 21 with a tape so as to be prevented from falling off the balloon fixing rod 21.

It is not always required that the method of fixing to the balloon fixing rod 21 be the use of a tape. A screw portion may be formed at the distal end of the balloon-popping game apparatus 22, and the screw portion may be threadedly fixed to the balloon fixing rod 21.

The balloon is accommodated in the balloon-popping game apparatus 22 under a state in which the balloon is inflated.

In FIG. 15, a game aircraft 500 is illustrated. A drone that can be remotely controlled is used as the game aircraft 500 according to one embodiment of the present invention. The drone is well known as a multicopter which is capable of flying by remote control without a pilot. Various kinds of drones are provided in accordance with a purpose of use. The balloon-popping game apparatus according to the present invention is adopted in competing for balloon-popping while remotely controlling a drone. Thus, among the drones, a hobby drone for enjoyment as a hobby is particularly suitable.

In the game aircraft 500 of FIG. 15, wing portions of the drone are used as the pressing portions. However, pressing members may be provided as the pressing portions to the game aircraft 500. For example, plate-shaped members may be provided to the wing portions of the drone 500.

Two or more players operate the game aircrafts 500 to hit the pressed portion of the balloon-popping game apparatus 22 with the pressing portion so that the balloon is popped. A winner is determined based on the number of balloons having been popped.

Further, one player may perform the balloon-popping at a time to compete for time taken before popping the balloon.

Further, the balloon-popping game body 22 may be attached to the game aircraft 500 to play a midair battle in which a balloon is popped by two or more players.

The embodiments of the present invention have been described in detail with reference to the drawings. However, a specific configuration is not limited to those of the embodiments described above. For example, changes in design without departing from the scope of the present invention are encompassed in the present invention. Further, technologies in the above-mentioned embodiments described above may be used in combination as long as there is no particular contradiction or problem in, for example, purpose and configuration.

REFERENCE SIGNS LIST 1 midair balloon-popping game apparatus
2 drone
3 attachment portion
4 balloon
5 container
6 pressed portion (lid)
7 balloon-popping member (advancing/retreating member)
8 pressing portion
9 shock absorber
10 balloon insertion hole
13 pressing portion (annular protruding portion)
15 balloon fixing portion
20 fixing base
21 balloon fixing rod
22 balloon-popping game apparatus 22
23, 230, 330 container (belt)
24, 240, 340 pressed portion
24A front surface of pressed portion
25, 250, 350 balloon-popping member
30 attachment portion
50 balloon attachment hole
60, 600, 700 balloon-popping portion
230A, 330A hole
270 silicon switch
280, 380 lid body
370 tubular body
390 spring
500 game aircraft (drone)

The invention claimed is:

1. A balloon-popping game apparatus, comprising:
a container configured to accommodate a balloon in an inflated state;
a pressed portion provided on an outer side of the container;
a balloon-popping portion configured to pop the balloon inside the container in response to the pressed portion being pressed; and
an annular protruding portion provided around the container and projecting outward of the container beyond the pressed portion,
wherein the annular protruding portion is configured to collide with a pressed portion of a balloon-popping game apparatus of another player.

2. The balloon-popping game apparatus according to claim 1, wherein the container has a balloon insertion hole for allowing a balloon that is in an uninflated state to be inserted into the container.

3. The balloon-popping game apparatus according to claim 1, wherein the pressed portion includes a plurality of pressed portions arranged around the container.

4. The balloon-popping game apparatus according to claim 1, wherein the balloon-popping portion is an advancing/retreating member which is always urged to a non-contact retreating position with respect to the balloon inside the container, and
wherein the advancing/retreating member is configured to advance from the retreating position to pop the balloon inside the container in response to the pressed portion being pressed.

5. The balloon-popping game apparatus according to claim 4, wherein the advancing/retreating member has a sharp distal end portion.

6. The balloon-popping game apparatus according to claim 4, further comprising a substance that is configured to cause the balloon to pop in response to being in contact with the balloon, and is held at a distal end portion of the advancing/retreating member.

7. The balloon-popping game apparatus according to claim 1, wherein the pressed portion includes a lateral pressed portion and an upward and/or downward pressed portion.

8. The balloon-popping game apparatus according to claim 1,
wherein the annular protruding portion is a horizontal annular protruding portion provided around the container, and
wherein the annular protruding portion serves as a pressing portion.

9. A game aircraft, comprising:
the balloon-popping game apparatus of claim 1; and
a drone, which is remote-controllable, and allows the balloon-popping game apparatus to fly.

10. A midair balloon-popping game apparatus attachable to a remotely controllable drone, the midair balloon-popping game apparatus comprising:
a container, which includes an attachment portion for attachment to the drone and is configured to accommodate a balloon in an inflated state;
a pressed portion which is provided on an outer side of the container;
a balloon-popping member which is configured to pop the balloon inside the container in response to the pressed portion being pressed; and
an annular protruding portion provided around the container and projecting outward of the container beyond the pressed portion,
wherein the annular protruding portion is configured to collide with a pressed portion of a midair balloon-popping game apparatus of another player.

11. A balloon-popping game apparatus attachable to a base, the balloon-popping game apparatus comprising:
a container, which includes an attachment portion for attachment to the base and is configured to accommodate a balloon in an inflated state;
a pressed portion provided on an outer side of the container;
a balloon-popping portion which is configured to pop the balloon inside the container in response to the pressed portion being pressed; and an annular protruding portion provided around the container and projecting outward of the container beyond the pressed portion,
  wherein the annular protruding portion is configured to collide with a pressed portion of a balloon-popping game apparatus of another player.

12. The balloon-popping game apparatus according to claim 11, wherein the container has a balloon insertion hole for allowing a balloon that is in an uninflated state to be inserted into the container.

13. The balloon-popping game apparatus according to claim 11, wherein the pressed portion includes a plurality of pressed portions arranged around the container.

14. The balloon-popping game apparatus according to claim 11, wherein the balloon-popping portion is an advancing/retreating member which is always urged to a non-contact retreating position with respect to the balloon inside the container, and
  wherein the advancing/retreating member is configured to advance from the retreating position to pop the balloon inside the container in response to the pressed portion being pressed.

15. The balloon-popping game apparatus according to claim 14, wherein the advancing/retreating member has a sharp distal end portion.

16. The balloon-popping game apparatus according to claim 14, further comprising a substance that is configured to cause the balloon to pop in response to being in contact with the balloon, and is held at a distal end portion of the advancing/retreating member.

17. A game aircraft, comprising:
  the balloon-popping game apparatus of claim 11; and
  a drone, which is remote-controllable, and allows the balloon-popping game apparatus to fly.

18. A game method, comprising:
  remotely operating a first game aircraft comprising a first balloon-popping game apparatus of claim 11,
  wherein the remotely operating the first game aircraft includes causing a pressing portion of the first game aircraft to collide with the pressed portion of a second balloon-popping game apparatus of claim 11 so that the pressed portion is pressed to pop the balloon accommodated in the container of the second balloon-popping game apparatus.

* * * * *